Nov. 30, 1954 S. Y. GIBBON 2,695,608
ADJUSTABLE CLOSURE DEVICE FOR SPECIAL PURPOSE CHAMBERS
Filed Nov. 6, 1950 2 Sheets-Sheet 1

INVENTOR
Samuel Y. Gibbon
BY
Harris S. Campbell
ATTORNEY

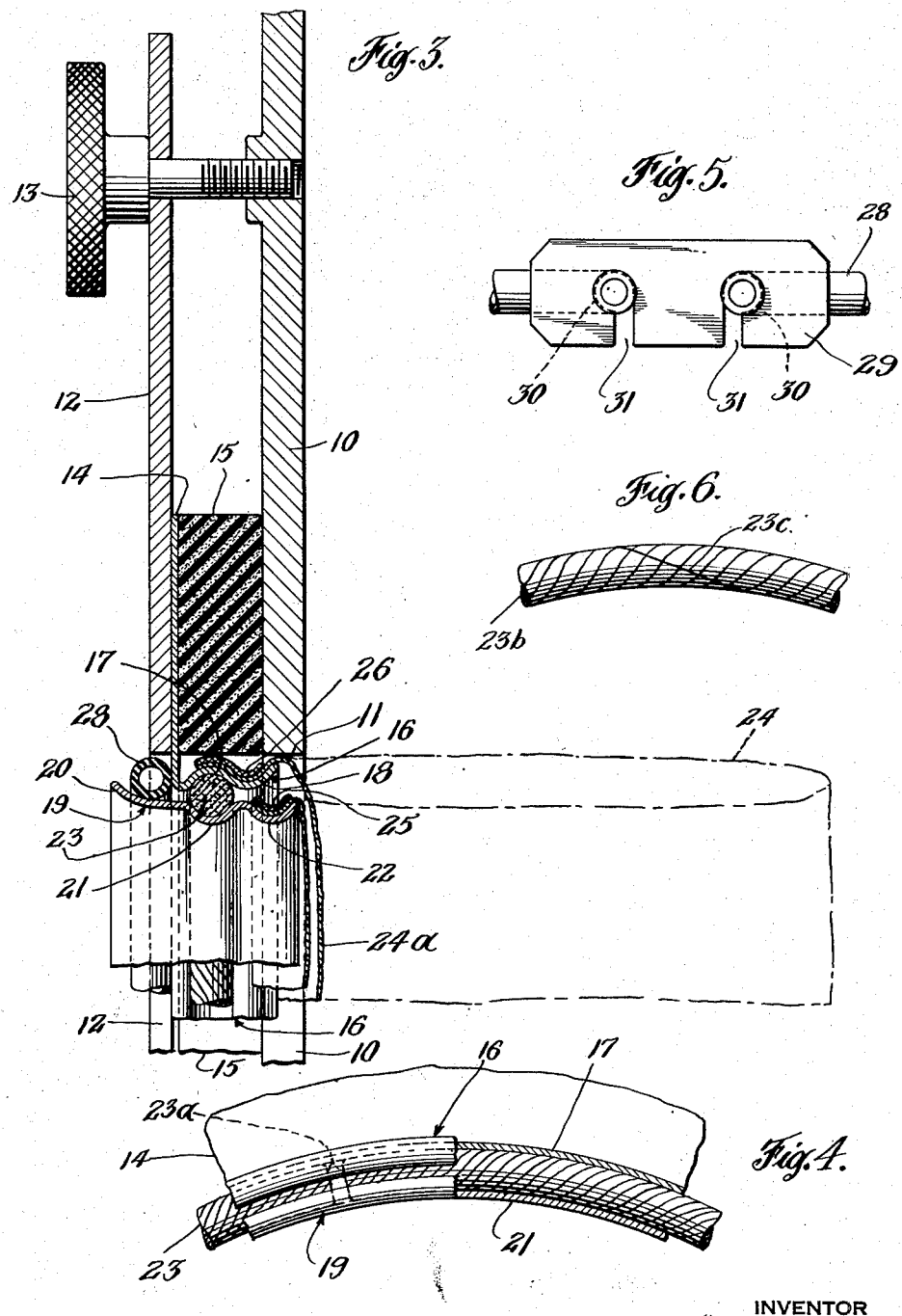

United States Patent Office 2,695,608
Patented Nov. 30, 1954

2,695,608

ADJUSTABLE CLOSURE DEVICE FOR SPECIAL PURPOSE CHAMBERS

Samuel Y. Gibbon, Jenkintown, Pa., assignor, by mesne assignments, to Children's Hospital of Philadelphia, Philadelphia, Pa., a corporation of Pennsylvania Application November 6, 1950, Serial No. 194,364

15 Claims. (Cl. 128—30)

This invention relates to bearing construction and closure devices for openings in special chambers. The present invention is particularly directed to improvements in adjustable closure devices suitable for permitting a portion of the body such as a limb or the head to project through from one side of the opening to the other.

For many purposes it is desirable to provide a chamber having a special atmosphere or pressure condition to be used in connection with the treatment of certain ailments. When using such a chamber it is often necessary that the patient or an attendant have access through openings into the chamber. To prevent loss of special atmosphere or pressure from the chamber, a closure seal is required around the arm or other part extending into the chamber. The present invention provides for improvements in flexible adjustable closure seals such as disclosed in my U. S. patent application, Serial Number 132,625, filed December 12, 1949.

In applying the closure device to an existing opening, the present construction allows the maximum size of useful opening as compared to the actual opening into which the closure device is to be inserted. This is accomplished by the compact construction, particularly in a radial direction, of the mounting and the rotational adjusting parts of the mechanism. In the present arrangement mounting may be accomplished by means of a flat plate structure which is adapted to contact the wall of the chamber around the opening. A circular flange is provided to fit into the opening in the wall and another circular collar is arranged to closely fit inside the circular flange. In this way the radial dimensions are kept to a minimum and the effective opening is almost as great as the actual opening in the wall of the chamber. At the same time the thickness may be kept to a minimum. This is important in connection with certain applications as will be evident from the description.

An important object of the invention is to provide an adjustable closure which is extremely flexible in its use and may be quickly operated by a rotational movement of the inner collar to provide a seal either around an object passing through the opening or for closing the complete opening. The sealing action in the present instance is intended to take care of moderate pressure differences, for example, such as those associated with respirator apparatus.

An object of the invention is to provide an improved bearing construction for special purposes such as for supporting the rotating ring within the fixed ring of the device. This improved bearing contains a bearing member which serves as the means for retaining the two races in assembled relationship and provides for substantially permanent lubrication to give smooth, trouble-free operation when used with devices which have relatively slow speeds and light loads. If desired, the bearing unit may be constructed to provide direct retention of pressure.

When a device of this nature is used with a chamber having pressure associated therewith, particularly when the pressure fluctuates such as in an artificial respirator, there is a tendency for the pressure to cause rotation of the sealing device in a sense to loosen it from its adjustable position. It is an object of the present invention to provide a simple, quick-acting mechanism for retaining the closure device in its adjusted position against the effects of internal pressure or other forces which might cause undesired movement.

In apparatus of the present nature in which a flexible sleeve is used to provide the closure medium, the effect of internal pressure may cause the sleeve to be forced out of its assembled position on the ring. It is an object of the present invention to provide means for anchoring the closure sleeve against dislodgment from the supporting flange.

How the foregoing and other objects and advantages of the invention are accomplished will be clear from the following description of the drawings in which—

Figure 3 is an enlarged sectional view of the ring mounting construction taken on the lines 3—3 of Figure 1.

Figure 4 is an enlarged view of a portion of the bearing race looking toward the left in Figure 3, with certain parts in section showing the manner in which the bearing material is used to support the race parts.

Figure 5 is a view to an enlarged scale of the adjustment block for the position retention device.

Figure 6 is a view of an alternate construction for the bearing member.

Figure 1:
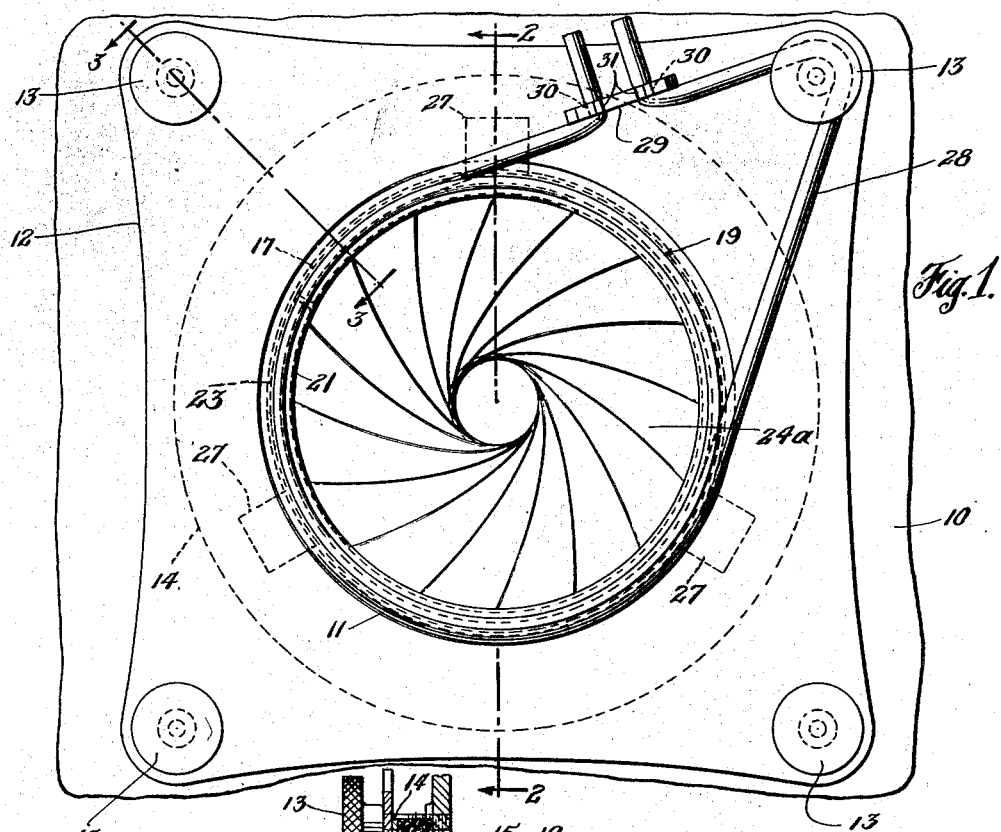
Figure 1 shows a front view of the closure device of the present invention shown mounted on the opening of an artificial respirator.

Referring to the figures it will be seen that the closure unit may be supported on the wall plate 10 of an artificial respirator or other apparatus with which the closure device is to be used. An access opening 11 is provided and the closure device is arranged to fit closely the diameter of opening 11. In the present example, the closure unit is held in position by means of the clamp plate 12 and the tightening screws 13 which are a part of the normal artificial respirator equipment. As will be seen more clearly in the enlarged view, Fig. 3, the closure device incorporates a plate member 14 against which the supporting plate 12 is pressed upon tightening of the hand screws 13. A large rubber gasket 15 is inserted between the wall plate 10 and the plate 14 to provide a resilient mounting for the closure unit which at the same time is leak proof.

The closure device has the outer ring of its opening formed by a flange member 16 which is integral with the mounting plate 14. This annular flange member 16 is suitably shaped, preferably by spinning, and incorporates a rounded depression or race 17 and another external groove 18. Another annular member or ring 19 is formed to fit inside the diameter of the flange 16. This ring member 19 incorporates a smooth external curved lip 20 and an annular depression 21 which is located opposite the race 17 in the external ring 16. Also in the internal ring 19 an annular groove 22 is formed at the inner side of the member.

In order to support the inner ring 19 of the closure device in proper relationship with the external flange member 16, a bearing member consisting of a cord 23 is inserted to fit in the grooves 17 and 21. Cord 23 is preferably of woven nylon or similar material which provides resilient qualities to resist crushing, does not deteriorate in the presence of moisture or lubricant, and gives good wearing characteristics as a bearing. The nylon cord 23 may be deformed to some extent for assembly purposes and the proportions of the groove and annular space between members 16 and 19 are so arranged that the cord 23 may be forced into position in the supporting grooves to maintain the two members in assembled relationship. The length of the nylon cord 23 is such that it perferably fills practically the complete circumference of the rings. The relationship of the cord member to the rings and their races 17 and 21 is clearly illustrated in Figures 3 and 4, the ends of the cord being indicated at 23a. Nylon cord has a texture which when used with rings of aluminum provides a very smooth bearing permitting easy rotational adjustment of the inner ring 19 with respect to the outer ring 16. If desired, a small amount of lubricant may be added to the nylon cord at assembly.

In some instances it may be desirable to make the bearing unit capable of resisting pressure directly. To accomplish this the cord member 23 is made in the form of an endless ring. This may be done either by weaving or by the arrangement shown in Figure 6. As illustrated, the ends may be cut to form a long, angled joint and cemented together to form a continuous ring. The material is sufficiently resilient to expand slightly for assembly purposes.

Figure 2:
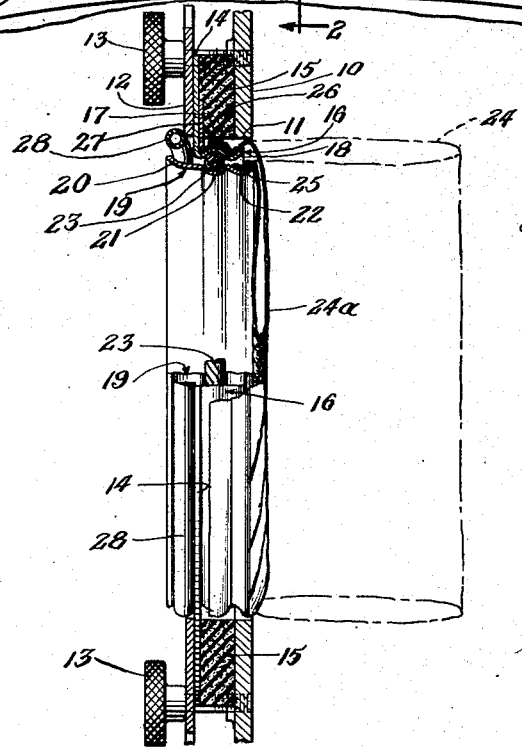
Figure 2 is a sectional view taken in the direction of arrows 2—2, Figure 1, with certain parts appearing partly in elevation.

The closure material for the opening is in the form of a cylindrical sleeve which may be of thin flexible plastic sheet material. This cylindrical sleeve is shown in open or first assembled position by dotted outline 24. Referring to Figures 2 and 3, it will be clear that one end of the tubular sleeve 24 is fastened to the inner ring 19 by means of an elastic collar 25 which fits into groove 22 and securely retains the end of the sleeve 24 in position. Similarly, the other end of sleeve 24 is fastened into the groove 18 in the outer ring 16 by means of another elastic ring or collar 26. When the inner ring 19 is rotated with respect to the outer ring 16 the sleeve 24 folds back on itself and pulls down to position indicated by full lines 24a to form a seal surface for the opening. The amount of rotation determines the degree of closing since the flexible material folds over on itself somewhat in the fashion of an iris type of closure mechanism. By varying the degree of rotation an opening of any desired size may be obtained or the opening may be completely closed. Thus, when used with a respirator device the patient's head projects outside the respirator through the opening ring and the collar 19 is adjusted until the flexible closure material fits gently and snugly around the patient's neck to prevent the escape of the air pressure within the respirator. It will also be obvious that the construction of the closure device is also well suited for other uses such as where hand-holes are required for working inside an enclosed space, or for other purposes where at times it may be desired to have a member extend between an open and a closed chamber.

Since in the closed position, the end of the sleeve 24 which is attached to the outer groove 22 has the pressure directly applied to it, there is the possibility that the sleeve may be forced off the groove by application of excess pressure. In order to prevent this, fabric tabs 27 are attached at intervals around the circumference of the end of the sleeve 24, as shown in Figures 1 and 2. These tabs are placed between the seal 15 and the plate 14 so that when the closure device is clamped in position the tabs 27 are anchored in place and prevent displacement of the end of the sleeve 24 from the retaining groove 18.

When the closure apparatus is used under conditions of fluctuating pressure, such pressure on seal surface 24a may cause a slight rotating action of the inner ring 19 to occur. In order to prevent movement of the inner ring 19 with respect to the outer ring 16 after it has been properly adjusted, a retention device is used to maintain the proper relative position. This retention device consists of a flexible rubber tube 28 which is passed around the outer ring to engage the lip 20 and the plate 14. The tube is then stretched to go over one of the handles of the hand screws 13. This holds it in fixed position and the tension and friction provided by the rubber tubing prevent motion of the ring 19. Adjustment of the length of rubber tubing and its tension is made by the use of a simple connecter member or anchor block 29. The shape of this is more clearly shown in Figure 5, where it will be seen that there are two circular openings 30 with slots 31 extending to the edge of the plastic plate member 29. The slots 31 are slightly narrower than the diameter of the holes 30. Holes 30 are in turn slightly smaller than the diameter of the tubing 28. When the rubber tubing is adjusted to proper length and slipped into the openings 30 through the slots 31, it is held in position against slippage due to the angle at which the tubing pulls under tension.

From the foregoing, it will be clear that I have provided an adjustable closure device of improved and simplified construction. The placing of the rotating ring inside the stationary supporting ring results in a narrow and compact arrangement for the unit having the sealing material or diaphragm at the inside of the opening. The unit may thus be made only slightly thicker than the wall in which it is inserted. The use of the fibrous cord such as nylon for assembling the two rings and for providing the bearing medium permits compact dimensions so that the diameter of the opening in the closure unit need only be slightly smaller than the opening in the wall structure into which the unit is mounted. This use of a cord member as a bearing and for retention purposes further accomplishes the rotational assembly with a single element, thus eliminating the need for a plurality of balls and a ball retainer device. At the same time a smooth operating and long lasting bearing is provided. The construction of the closure sleeve with the retention tabs which may be held between the mounting flange and the wall structure or a suitable gasket, overcomes an annoying problem in securing the closure to the rim against internal pressures. The device for preventing accidental rotation of the adjustable ring is highly effective and permits rapid adjustment to meet the varied conditions by the use of the special anchor block for holding the rubber tubing. The use of a continuous cord member provides a simple and reliable method of producing a bearing unit capable of direct sealing against pressure.

I claim:

1. A special purpose chamber in which it is desired to control atmospheric conditions, said chamber having a wall with an opening therein, a closure device for said opening including an outer ring member adapted to be supported on said wall, said ring member having an annular groove which is concave in an inwardly direction and another annular groove near the edge of said ring which is concave in an outwardly direction, a second ring member adapted to fit inside said first ring member and having an annular groove which is concave outwardly and a second annular groove near the edge of said second ring member which is also concave outwardly, a cylindrical fibrous cord member adapted to fit between said ring members in the first mentioned grooves for each ring and extend around said rings for the major portion of their circumference, a generally cylindrical sleeve member of flexible sheet material having an elastic device for attaching one end thereof to the edge groove of said outer ring member and an elastic device to attach the other end to the edge groove of the inner ring member.

2. An adjustable closure device for closing the opening to a chamber, said device having an outer ring with a portion for supporting it on the wall of a chamber, said outer ring having an annular groove which is concave in an inwardly direction, a second ring having a diameter slightly smaller than the diameter of the said first ring to permit it to fit inside thereof, said second ring having an annular groove which is concave on the outer side of the ring, and a cylindrical flexible cord member having a length approximating the length of the circumference of said inside ring, said cord member having a cross-section diameter adapted to fit in said annular grooves to provide for assembling the inner ring in proper relationship with respect to said outer ring and to permit relative rotation between said rings said device also comprising closure means mounted on said rings.

3. A closure device for closing the opening to a chamber, said device having a circular ring member having a diameter approximating the diameter of the opening for which it is intended, an external flange on said ring member for supporting it in position, an annular groove in said ring member, a second ring member adapted to fit inside said first ring member, said second ring member also having an annular groove positioned to complement the annular groove in said first ring, and a flexible cord having a diameter to permit insertion in said grooves between said ring members for retaining them in rotational assembled relationship, said device also comprising closure means mounted on said rings.

4. An adjustable closure device for closing the opening to a chamber, said device having a fixed outer ring with a grooved bearing race, an inner ring of slightly smaller diameter than said outer ring extending beyond the outer ring on both sides, said inner ring also having a grooved bearing race complementary to the race in the outer ring, and a bearing member in the form of an elongated flexible cord proportioned to fit between said races to rotatably retain said inner ring in assembled relationship on said outer ring, said device also comprising closure means mounted on said rings.

5. A closure device for mounting in an opening in a chamber wall, said closure device including a fixed outer ring with supporting means for mounting purposes, said outer ring having an annular depression at one end thereof, an inner ring rotatably mounted with respect to said outer ring and having an annular depression around one end, and a cylindrically shaped flexible closure sleeve having one end adapted to fit into the depression in the outer ring and the other end adapted to fit into the depression in the inner ring, said sleeve having spaced tabs connected to the end engaging the outer ring, said tabs being arranged to be held by the portion of the outer ring which supports it on the wall.

6. For a closure device adapted to be mounted in an opening in the wall of a chamber, an adjustable closure member, a fixed outer ring mounted to said opening for attaching the closure member, an inner ring rotatably mounted on the outer ring and engaging said closure member, said inner ring extending outwardly beyond the outer ring and having a flared lip, and a resilient tension member for engaging said lip and positioned to interact between a fixed part and said rotatable ring to restrain the inner ring from rotational movement.

7. A closure device having a ring adapted to engage a wall, a second ring mounted for rotation with respect to said first ring, each of said rings having complementary grooved races, and a fibrous cord member adapted to fit in the grooved races and substantially encircle the inner of said rings to provide both for the retention means for the assembly and as the bearing member which permits relative rotation of the rings said device also comprising closure means engaging said rings.

8. In a closure device for closing an opening in the wall of a special purpose chamber, the combination of a ring formed of sheet metal and having a flange for mounting it to said opening, said ring also having a grooved race therein, a second ring formed of sheet metal having a grooved race to complement the grooved race in said first ring, and a flexible, fibrous cord member having a diameter suitable for fitting in the grooved races to provide for the assembly and rotation of said rings, said rings and said cord member having sufficient inherent elasticity to provide a snap fit to facilitate assembly and disassembly, while nonetheless retaining the assembled rings in fixed axial relationship.

9. A closure device for a special purpose chamber having a pair of rings with complementary grooved races therein, a bearing member to fit said grooved races to provide both for assembly retention and for rotation, a cylindrical shaped flexible closure sleeve having an end attached to each ring to provide for closing the opening of the rings when one of the rings is rotated with respect to the other, and a resilient tension member for engaging the rotatable ring to maintain it in proper adjusted position.

10. A closure device for a special purpose chamber having a pair of rings with complementary grooved races therein, a bearing member to fit said grooved races to provide both for assembly retention and for rotation, a cylindrical shaped flexible closure sleeve having an end attached to each ring to provide for closing the opening of the rings when one of the rings is rotated with respect to the other, a resilient tension member for engaging the rotatable ring to maintain it in proper adjusted position, and an adjustable block having a pair of holes therein which are slightly smaller in diameter than the diameter of said resilient tension member, and a pair of slots extending one from each hole to the edge of said block, the width of said holes being less than the diameter of said holes.

11. A device for constricting an opening in the wall of a therapeutic chamber, comprising an adjustable closure member, a pair of rings supporting said closure member and nested one within the other, said rings being of substantial dimension in an axial direction and each having an annular groove, said grooves being of symmetrical arcuate cross-section and of opposite concavity, and a peripheral bearing and positioning element in the form of a continuous flexible cord of resilient low-friction material, snugly housed within and between said grooves, and means for mounting said ring assembly in the opening referred to.

12. A rotatable device having an outer race formed from relatively thin metal and having a groove around the inside thereof, an inner race formed of relatively thin metal and having a complementary groove circumferentially located, and a woven cord member to fit in said grooves for the purpose of retaining said races in assembled relationship and permitting relative rotation to each other, the length of said cord being approximately the circumference of the inner race said races and said cord member together having sufficient inherent elasticity to provide a snap fit between parts.

13. A device for constricting an opening in the wall of a therapeutic chamber comprising closure means operable on rotation to constrict said opening, a pair of cooperating sleeve-like members, nested one within the other, and formed of spun aluminum, both being provided in their opposite faces with a peripheral groove arcuate in cross-section, and a nylon cord member of a diameter to be snugly housed within and between said grooves, said device also having means for mounting it to the opening aforesaid.

14. A closure device for a special atmosphere chamber having a ring-operated closure member, the combination of an outer ring and an inner ring, one of said rings having supporting structure for mounting the closure on a wall, the other of said rings being arranged for relative rotation therewith, said rings having complementary annular races, and a bearing member in the form of an elongated cord approximating the length of the circumference of said rings, said bearing member being supported in said races to provide rotation between said rings and at the same time to maintain them in assembled relationship.

15. A closure device for a special atmosphere chamber, said device having an outer ring and an inner ring, one of said rings having supporting structure for mounting the closure on a wall, the other of said rings being arranged for relative rotation therewith, said rings having complementary annular races, a bearing member in the form of an elongated cord supported in said races to provide relative rotation between said rings and at the same time to maintain them in assembled relationship, and a closure sleeve for closing the opening in said rings upon relative rotation of the rings, each of said rings having an annular lip at adjacent ends, one end of said sleeve being retained adjacent the lip of the fixed ring and the other end of said sleeve being retained adjacent the lip of the rotatable ring.

References Cited in the file of this patent

UNITED STATES PATENTS

| Number | Name | Date |
| --- | --- | --- |
| 873,841 | Cole | Dec. 17, 1907 |
| 1,936,863 | Skillman | Nov. 28, 1933 |
| 2,405,682 | Bogoslowsky | Aug. 13, 1946 |
| 2,478,852 | Wallin | Aug. 9, 1949 |